United States Patent
Shimohata et al.

(10) Patent No.: US 9,545,573 B2
(45) Date of Patent: Jan. 17, 2017

(54) INFORMATION PROCESSING SYSTEM, GAME SYSTEM, INFORMATION PROCESSING APPARATUS, RECORDING MEDIUM AND INFORMATION PROCESSING METHOD

(71) Applicant: NINTENDO CO., LTD., Kyoto (JP)

(72) Inventors: Yasuyuki Shimohata, Kyoto (JP); Kuniaki Ito, Kyoto (JP); Hideki Ohashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 175 days.

(21) Appl. No.: 13/872,301

(22) Filed: Apr. 29, 2013

(65) Prior Publication Data

US 2013/0324262 A1   Dec. 5, 2013

(30) Foreign Application Priority Data

Jun. 1, 2012   (JP) .................................. 2012-126322

(51) Int. Cl.
| | |
|---|---|
| *H04B 7/00* | (2006.01) |
| *A63F 13/428* | (2014.01) |
| *H04W 4/00* | (2009.01) |
| *A63F 13/44* | (2014.01) |
| *A63F 13/47* | (2014.01) |
| *A63F 13/95* | (2014.01) |

(52) U.S. Cl.
CPC ............ *A63F 13/428* (2014.09); *A63F 13/44* (2014.09); *A63F 13/47* (2014.09); *A63F 13/95* (2014.09); *H04W 4/008* (2013.01)

(58) Field of Classification Search
CPC ........ H04W 4/008; H04W 4/22; H04W 12/06; H04W 4/06; H04W 4/206; H04W 52/0274; H04W 52/029; H04W 88/06
USPC ......................................................... 455/41.2
See application file for complete search history.

(56) References Cited

U.S. PATENT DOCUMENTS

| | | | | |
|---|---|---|---|---|
| 2003/0045354 A1* | 3/2003 | Giobbi | ................... | G07F 17/32 463/40 |
| 2004/0228460 A1* | 11/2004 | Keramane | ........ | H04M 1/72577 379/110.01 |

(Continued)

FOREIGN PATENT DOCUMENTS

| | | |
|---|---|---|
| JP | H11-203367 | 7/1999 |
| JP | 2005-168539 | 6/2005 |

(Continued)

*Primary Examiner* — Ajibola Akinyemi
(74) *Attorney, Agent, or Firm* — Nixon & Vanderhye, P.C.

(57) ABSTRACT

An example system includes: a communication device having a first wireless communication unit for sending and receiving data to and from an information processing apparatus through short-distance wireless communication; and an information processing apparatus having a second wireless communication unit for sending and receiving data to and from the communication device through short-distance wireless communication, a detector for detecting existence of the communication device in an effective communication area of the second wireless communication unit, an acceptance unit for accepting detection or non-detection by the detector as an input operation by a user, and an information processor for performing information processing in accordance with the input operation accepted by the acceptance unit.

19 Claims, 8 Drawing Sheets

(56) References Cited

U.S. PATENT DOCUMENTS

| | | | |
|---|---|---|---|
| 2005/0030384 A1* | 2/2005 | Lee | G08B 13/2454 |
| | | | 348/207.99 |
| 2007/0010200 A1* | 1/2007 | Kaneko | G01S 11/14 |
| | | | 455/41.2 |
| 2007/0129012 A1* | 6/2007 | Snow | H04M 1/72577 |
| | | | 455/26.1 |
| 2010/0255784 A1 | 10/2010 | Ido | |

FOREIGN PATENT DOCUMENTS

| | | |
|---|---|---|
| JP | 2005-176976 | 7/2005 |
| JP | 2010-245837 | 10/2010 |
| JP | 2011-097148 | 5/2011 |

\* cited by examiner

INFORMATION PROCESSING SYSTEM, GAME SYSTEM, INFORMATION PROCESSING APPARATUS, RECORDING MEDIUM AND INFORMATION PROCESSING METHOD

CROSS-REFERENCE TO RELATED APPLICATIONS

This application is based upon and claims the benefit of priority of the prior Japanese Patent Application No. 2012-126322, filed on Jun. 1, 2012, the entire contents of which are incorporated herein by reference.

FIELD

The technology herein relates to an information processing system, a game system, an information processing apparatus, a recording medium and an information processing method for performing information processing in accordance with wireless communication with a communication device.

BACKGROUND AND SUMMARY

Conventionally, a system for embedding an IC (Integrated Circuit) chip in a card-type medium or the like and exchanging data between the IC chip and an information processing apparatus through contactless and wireless communication has been widely used. This is known as a communication technology such as NFC (Near Field Communication) or RFID (Radio Frequency IDentification), with which an information processing apparatus can communicate wirelessly with an IC chip in a short range between approximately a few centimeters and a few meters. In recent years, such a wireless communication function is starting to be mounted on a game machine, a mobile telephone set and the like.

According to an aspect of the embodiment, an information processing system is provided with: a communication device having a first wireless communication unit for sending and receiving data to and from an information processing apparatus through short-distance wireless communication; and an information processing apparatus having a second wireless communication unit for sending and receiving data to and from the communication device through short-distance wireless communication, a detector for detecting existence of the communication device in an effective communication area of the second wireless communication unit, an acceptance unit for accepting detection or non-detection by the detector as an input operation, and an information processor for performing information processing in accordance with the input operation accepted by the acceptance unit.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, features, aspects and advantages of the technology herein will become clearer through the following detailed explanation with reference to the accompanying drawings.

DETAILED DESCRIPTION OF NON-LIMITING EXAMPLE EMBODIMENTS

Embodiment 1

Figure 1:
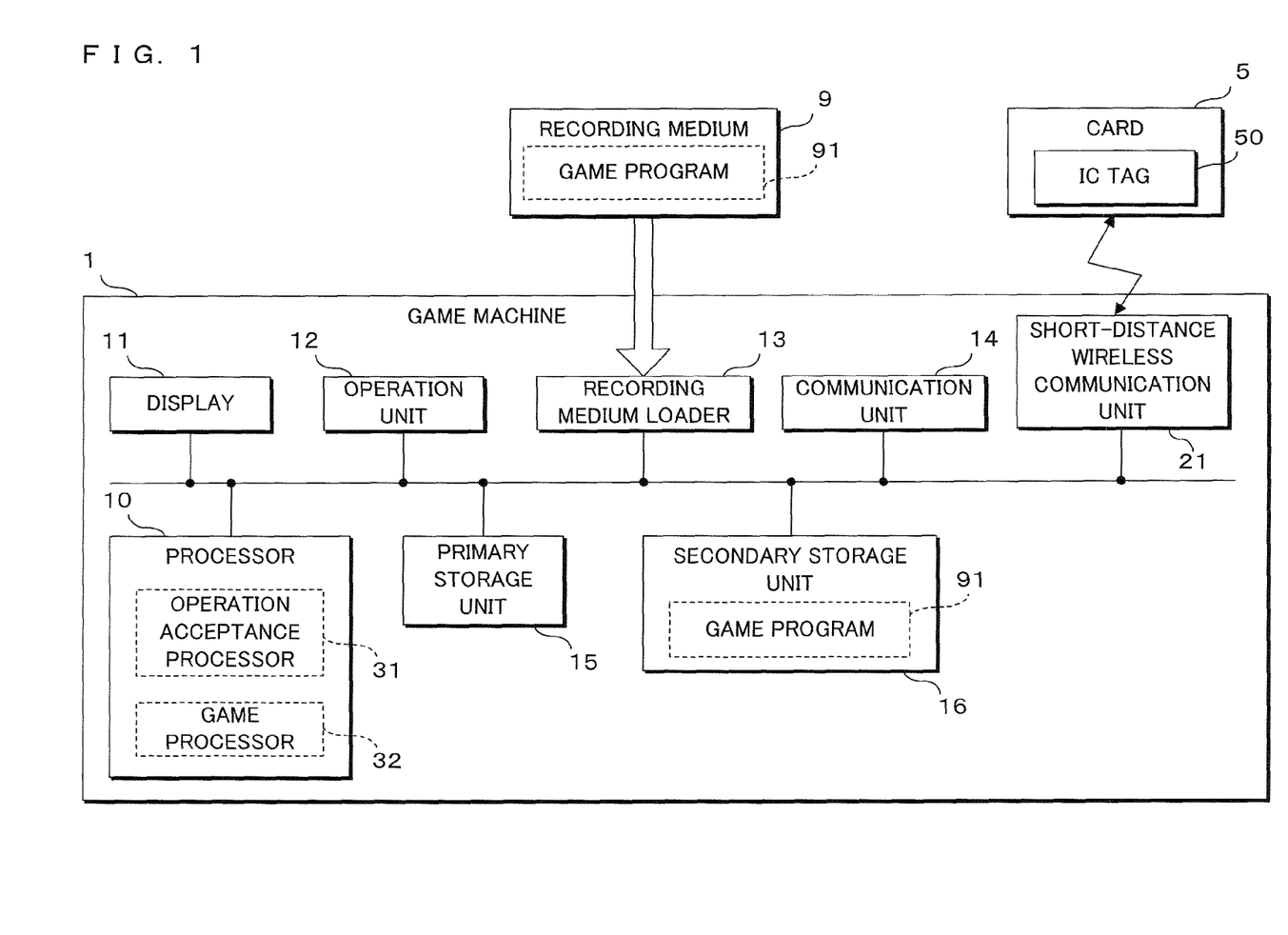
FIG. 1 shows an example non-limiting block diagram for illustrating the structure of a game system according to an embodiment.
Figure 2:
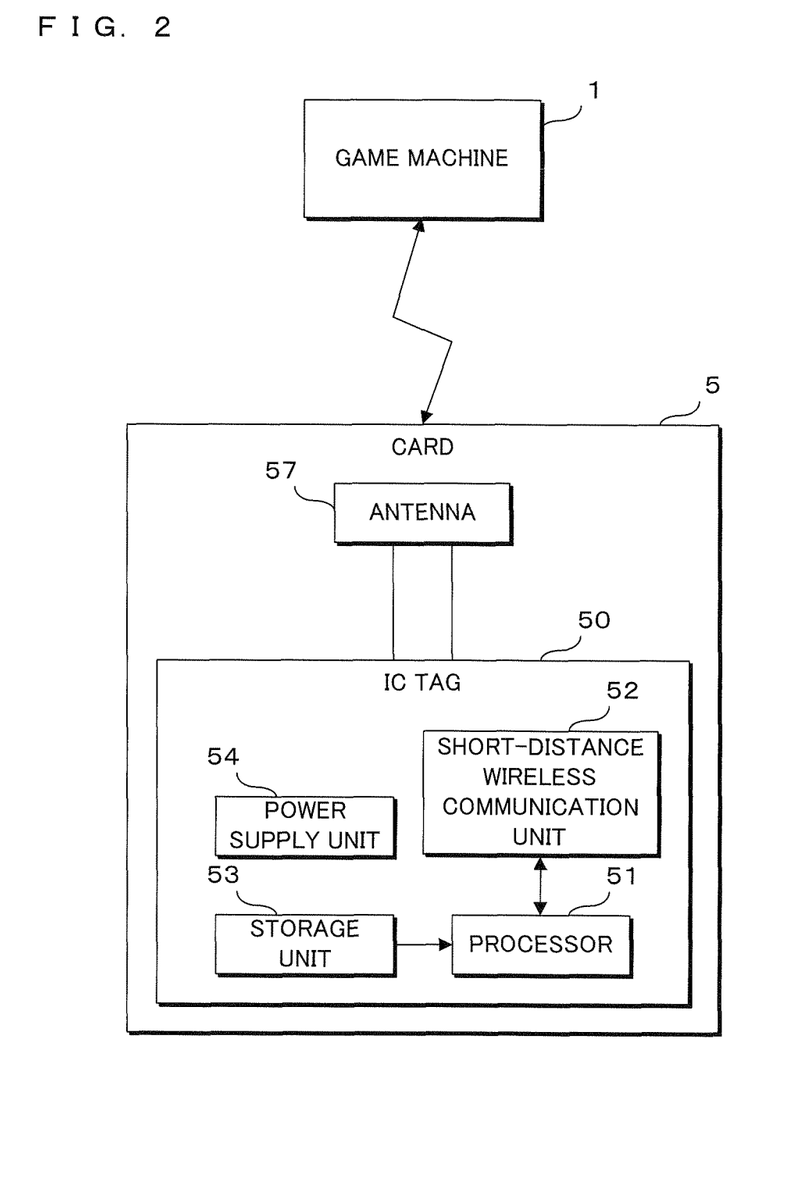
FIG. 2 shows an example non-limiting block diagram for illustrating the structure of a game system according to an embodiment.

FIGS. 1 and 2 show an example non-limiting block diagrams for illustrating the structure of a game system according to the present embodiment. A game system according to the present embodiment includes a portable game machine 1 which the user can carry and one or a plurality of cards 5. Details of the structure of the game machine 1 are illustrated in FIG. 1, and the structure of a card 5 is illustrated in FIG. 2.

As illustrated in FIG. 1, the portable game machine 1 has a display 11, a operation unit 12, a recording medium loader 13 and the like, which are respectively provided in a housing (which is omitted in the figures). In the housing of the game machine 1, a processor 10, a communication unit 14, a primary storage unit 15, a secondary storage unit 16, a short-distance wireless communication unit 21 and the like are held. The processor 10 of the game machine 1 is constituted of an arithmetic processing unit such as a CPU (Central Processing Unit) or an MPU (Micro Processing Unit). The processor 10 reads out a game program 91, which is stored in the secondary storage unit 16, or a game program 91, which is recorded in a recording medium 9 mounted on the recording medium loader 13, to the primary storage unit 15 and executes the read game program. In such a manner, the processor 10 performs various kinds of information processing involved in a game. For example, the processor 10 performs processing for accepting an operation performed to the operation unit 12. To give another example, the processor 10 performs processing for making a judgment or the like in a game in accordance with an accepted operation. To give yet another example, the processor 10 performs processing for generating a game image to be displayed on the display 11 in accordance with an accepted operation, an event in a game or the like.

The display 11 is constituted of a liquid crystal panel, a PDP (Plasma Display Panel) or the like. The display 11 displays an image given from the processor 10. The operation unit 12 is, for example, a push button, a touch panel provided on the display 11, or the like. The operation unit 12 notifies the processor 10 of the content of an operation performed by the user. The content of an operation is, for example, press or release of a button. The recording medium loader 13 is constructed in such a manner that a recording medium 9 of a card type, a cassette type, a disk type or the like can be attached and detached. The processor 10 can read out a game program 91 and other data from a recording medium 9 mounted on the recording medium loader 13.

The communication unit 14 sends and receives data to and from a server machine, another game machine 1 or the like via a network such as a mobile telephone network or a wireless LAN (Local Area Network). For example, the game machine 1 can download the game program 91 by causing the communication unit 14 to communicate with a server machine, and store the downloaded game program 91 in the secondary storage unit 16. The primary storage unit 15 is constituted of a semiconductor memory device or the like. The primary storage unit 15 temporarily stores various kinds of data to be generated in association with arithmetic processing by the processor 10. The secondary storage unit 16 is constituted of a nonvolatile storage device with a capacity larger than that of the primary storage unit 15. The secondary storage unit 16 stores the game program 91, other data and the like.

A short-distance wireless communication unit 21 is to send and receive data to and from an IC tag 50 embedded in the card 5 through contactless and wireless communication according to the communication standard of ISO/IEC18092 (so-called NFC), for example. The communication distance between the short-distance wireless communication unit 21 and the card 5 is between approximately a few centimeters and a few meters. The short-distance wireless communication unit 21 sends a signal instructing to read out stored data to the IC tag 50 of the card 5. As a response to the signal, the short-distance wireless communication unit 21 receives intended data from the IC tag 50. That is, the short-distance wireless communication unit 21 has a so-called IC tag reader function. The short-distance wireless communication unit 21 may be constructed to send data to be written and a signal instructing to write the data, so as to cause the IC tag 50 to write the data. That is, the short-distance wireless communication unit 21 may have an IC tag writer function.

The short-distance wireless communication unit 21 performs processing for sending control information or the like periodically and repeatedly. In accordance with whether a response to the sending processing has been received or not, the short-distance wireless communication unit 21 can detect existence of the card 5 in a communication area. The short-distance wireless communication unit 21 notifies the processor 10 of whether existence of the card 5 in the communication area has been detected or not. When the card 5 exists in the communication area, the short-distance wireless communication unit 21 sends a request for sending data to the card 5 on the basis of the processing by the processor 10. The short-distance wireless communication unit 21 receives data sent from the card 5 as a response to the request and gives the received data to the processor 10. The processor 10 can perform a variety of processing involved in a game on the basis of the data received from the card 5.

As illustrated in FIG. 2, the card 5 is an electronic medium having a structure in which the IC tag 50 and an antenna 57 are embedded within, for example, a substantially rectangular paper, substantially rectangular synthetic resin or the like. The antenna 57 can have a structure in which metallic wire is arranged in spiral in the card 5 and both ends thereof are connected with the IC tag 50, for example. The IC tag 50 is provided as one IC chip. The IC tag 50 has a processor 51, a short-distance wireless communication unit 52, a storage unit 53, a power supply unit 54 and the like.

The IC tag 50 does not have a power supply such as a battery. The IC tag 50 is activated by electromotive force to be generated by electromagnetic induction or the like when the antenna 57 receives a wireless signal from the game machine 1. The IC tag 50 is a so-called passive tag. The power supply unit 54 supplies electric power to the processor 51, the short-distance wireless communication unit 52, the storage unit 53 and the like in the IC tag 50 on the basis of the electromotive force. Such power supply enables activation of the respective components.

The short-distance wireless communication unit 52 of the IC tag 50 receives a signal sent from the game machine 1 at the antenna 57 and gives data involved in the received signal to the processor 51. The short-distance wireless communication unit 52 sends the data given from the processor 51 from the antenna 57 to the game machine 1. The storage unit 53 is constituted of a nonvolatile memory device such as a mask ROM (Read Only Memory) or an EEPROM (Electrically Erasable Programmable ROM). The storage unit 53 stores data such as a predetermined ID (IDentifier) number, for example. The processor 51 reads out data from the storage unit 53 in accordance with the data given from the short-distance wireless communication unit 52. The processor 51 gives the read data to the short-distance wireless communication unit 52 so as to send the data to the game machine 1. It is to be noted that the processor 51 writes data in the storage unit 53 in accordance with the data given from the short-distance wireless communication unit 52 when the storage unit 53 has a data-rewritable structure.

The game machine 1 according to the present embodiment accepts not only an input operation by the user at the operation unit 12 as described above, but also movement of the card 5 toward or away from the game machine 1 as an input operation so as to perform processing involved in a game. The game machine 1 accepts an input operation using the card 5 at the operation acceptance processor 31 of the processor 10. The game machine 1 causes the game processor 32 to perform game processing in accordance with an accepted operation. The operation acceptance processor 31 and the game processor 32 are software functional blocks to be realized when the processor 10 executes the game program 91.

Figure 3:
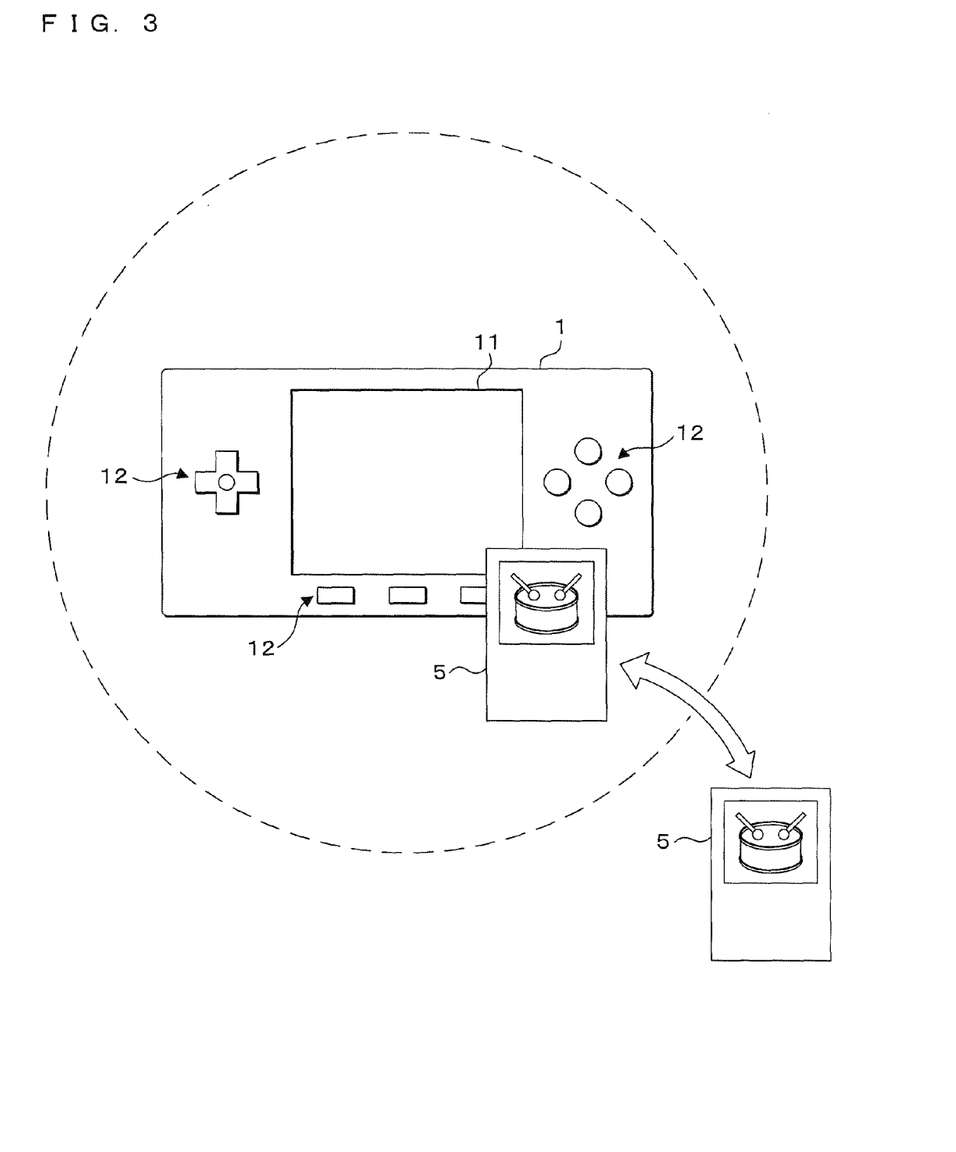
FIG. 3 shows an example non-limiting schematic view for explaining an input operation using a card.

FIG. 3 shows an example non-limiting schematic view for explaining an input operation using the card 5. It is to be noted that the communication area of the short-distance wireless communication unit 21 of the game machine 1 is illustrated in this figure as a circle with a dotted line. The operation acceptance processor 31 of the game machine 1 according to the present embodiment accepts movement of the card 5 from outside of the communication area of the short-distance wireless communication unit 21 to inside of the communication area as an input operation by the user. That is, the short-distance wireless communication unit 21 notifies the processor 10 of detection of the card 5 when a state where existence of the card 5 in the communication area is not detected by the short-distance wireless communication unit 21 changes into a state where the card 5 is detected. The operation acceptance processor 31 accepts an input operation as an event of detection of the card 5. Input operation acceptance processing can include processing for determining the type of an input operation, for example. The game processor 32 performs game processing in accordance with the operation accepted by the operation acceptance processor 31.

The operation acceptance processor 31 of the game machine 1 accepts movement of the card 5 from inside of the communication area of the short-distance wireless communication unit 21 to outside of the communication area as an input operation by the user. That is, the short-distance wireless communication unit 21 notifies the processor 10 of non-detection of the card 5 when a state where existence of the card 5 in the communication area is detected by the short-distance wireless communication unit 21 changes into a state where the card 5 is not detected. The operation acceptance processor 31 accepts an input operation as an event of non-detection of the card 5. The game processor 32 performs game processing in accordance with the operation accepted by the operation acceptance processor 31.

Illustrated in the figures is an example in which a game to play an instrument is played with the game machine 1. For example, the user alternately makes movement of the card 5 on which a picture of a drum is drawn, for example, toward the game machine 1 (movement to inside of the communication area) and movement of the card 5 away from the game machine 1 (movement to outside of the communication area). By the movements, the user can perform an operation of beating a drum at the game machine 1. When the short-distance wireless communication unit 21 notifies the processor 10 of the game machine 1 of detection of the card 5, the processor 10 accepts the notification as an operation of beating a drum. In accordance with the accepted operation, the processor 10 performs game processing such as outputting of a sound of a drum from a speaker (which is omitted in the figures) or displaying of an effect image showing that a drum has been beaten on the display 11, for example. After detecting the card 5 and accepting an operation of beating a drum, the processor 10 of the game machine 1 does not accept an operation of beating a drum before getting into a state where the card 5 is no more detected, even when the card 5 is detected again in the communication area.

The game machine 1 performs processing for outputting music from a speaker, for example. The game machine 1 performs processing for displaying a moving image of a character beating a drum in time to music on the display 11. Regarding the game machine 1, the processor 10 calculates a time lag between a time point when the character displayed on the display 11 beats a drum and a time point when the user moves the card 5 toward the game machine 1. The time point when the user moves the card 5 toward the game machine 1 is more specifically a time point of detection of the card 5 and is a time point when an operation of beating is accepted. The game machine 1 can be constructed to perform game processing such as adding points corresponding to the calculated time lag.

The game machine 1 can be constructed to perform game processing such as changing of the strength of power for beating a drum in accordance with time period when the card 5 exists in the communication area, for example. The time period when the card 5 exists in the communication area is more specifically a duration of continuous detection of the card 5 and is a duration of continuous operation of beating. The processor 10 calculates time period between a time point when a notification of detection of the card 5 is given from the short-distance wireless communication unit 21 and a time point when a notification of non-detection of the card 5 is given from the short-distance wireless communication unit 21. The processor 10 decides power for beating a drum in accordance with the calculated time period. The processor 10 performs game processing such as turning up or down the volume of a drum or changing an effect image in accordance with the decided power, for example.

The game machine 1 displays a list of a plurality of song titles to be selected on the display 11 in order for the user to select a song to be displayed, for example. The game machine 1 shows a selection state of a song title at the current time point by, for example, highlighting one of a plurality of song titles. When the user performs the operation of beating once using the card 5, the song titles change one by one. The user can further select a song title by performing the operation of beating two times in series. When the time interval between notifications of detection of the card 5 from the short-distance wireless communication unit 21 is shorter than a predetermined time period, the processor 10 of the game machine 1 judges that an operation has been performed two times in series. Upon the judgment, the processor 10 decides selection of a song title. Alternatively, the processor 10 counts the number of times the card 5 is detected, notification of which has been given from the short-distance wireless communication unit 21, in a predetermined time period. The processor 10 may be constructed to judge that a series of operations have been performed when the number of times of detection is two or more and decide selection of a song title.

Figure 4:
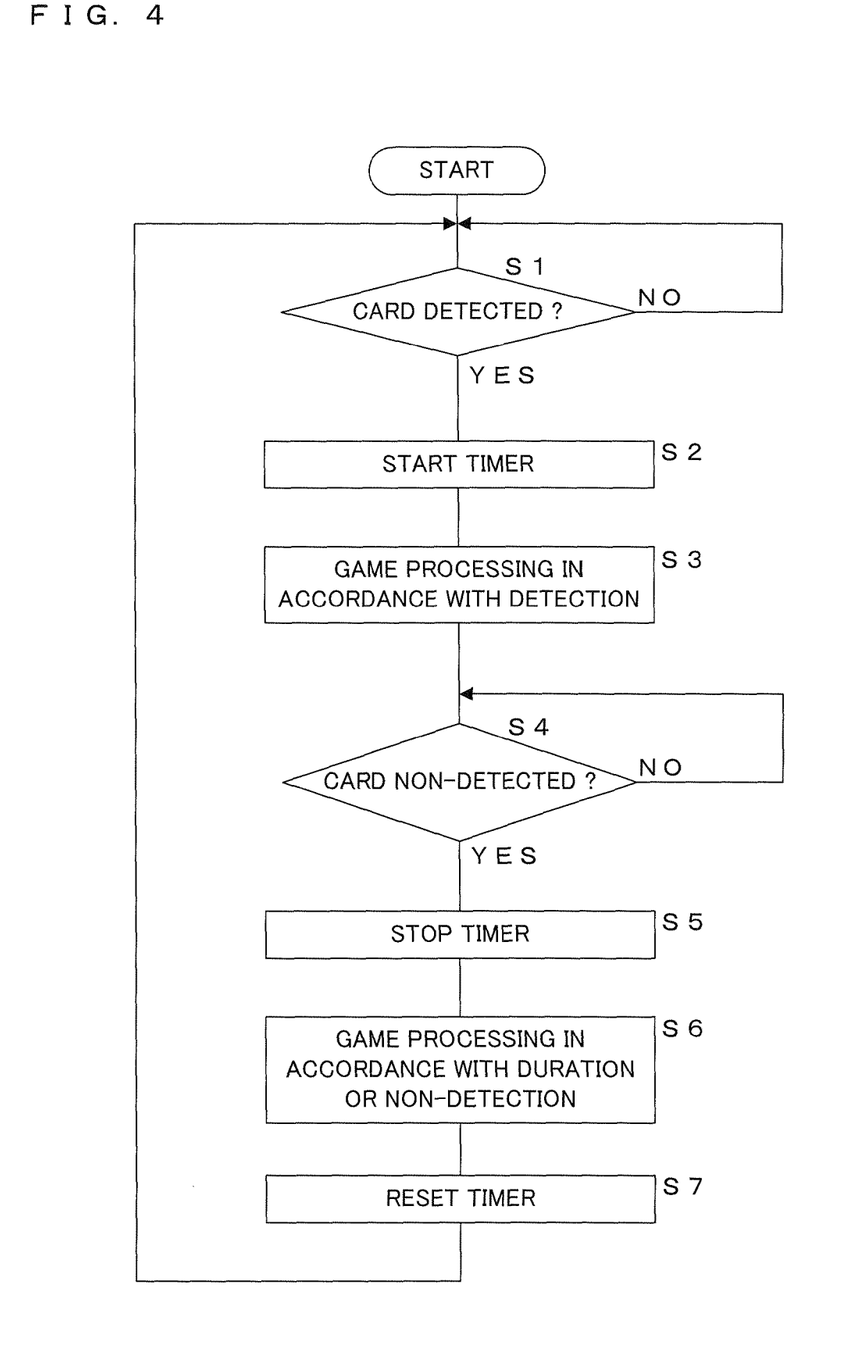
FIG. 4 shows an example non-limiting flowchart for illustrating the procedures of input operation acceptance processing to be performed by a processor of a game machine according to Embodiment 1.

FIG. 4 shows an example non-limiting flowchart for illustrating the procedures of input operation acceptance processing to be performed by the processor 10 of the game machine 1 according to Embodiment 1. Illustrated in this flowchart is a case where the game machine 1 accepts an input operation in accordance with detection or non-detection of the card 5 and an input operation in accordance with the duration of continuous detection of the card 5. For such processing, a timer for timing continuous detection of the card 5 is used. The timer is provided in the processor 10 as a software or hardware function, for example.

The operation acceptance processor 31 of the processor 10 of the game machine 1 judges whether notification that the card 5 has been detected in the communication area has been given from the short-distance wireless communication unit 21 or not (step S1). When notification of detection of the card 5 has not been given (S1: NO), the operation acceptance processor 31 of the processor 10 waits until notification of detection of the card 5 is given. When notification of detection of the card 5 is given (S1: YES), the operation acceptance processor 31 of the processor 10 starts timing by the timer (step S2). The game processor 32 of the processor 10 performs game processing in accordance with detection of the card 5 (step S3).

The operation acceptance processor 31 of the game machine 1 judges whether notification indicating that the card 5 is no more detected in the communication area has been given from the short-distance wireless communication unit 21 or not (step S4). When notification of non-detection of the card 5 has not been given (S4: NO), the operation acceptance processor 31 of the processor 10 waits until notification of non-detection of the card 5 is given. When notification of non-detection of the card 5 is given (S4: YES), the operation acceptance processor 31 of the processor 10 stops timing by the timer (step S5). The game processor 32 of the processor 10 performs game processing in accordance with the duration obtained by the timer or game processing in accordance with non-detection of the card 5 (step S6). After the game processing is terminated, the operation acceptance processor 31 of the processor 10 resets the timer (step S7) and returns the process to the step S1.

Regarding the game machine 1 according to Embodiment 1 having the structure described above, the short-distance wireless communication unit 21 detects the card 5 in the communication area and notifies the processor 10 of the detection result. The operation acceptance processor 31 of the processor 10 accepts detection or non-detection of the card 5 as an input operation and the game processor 32 performs game processing. In such a manner, the game machine 1 can accept not only an input operation by the user through a button, a touch panel or the like of the operation unit 12, but also movement of the card 5 toward or away from the game machine 1 as an input operation by the user. Based on detection or non-detection of the card 5, the game machine 1 performs game processing in accordance with the duration of continuous detection of the card 5, for example. To give another example, the game machine 1 performs game processing in accordance with a time point of detection or non-detection of the card 5 with respect to a moving image displayed on the display 11. To give yet another example, the game machine 1 performs game processing in accordance with the time interval between notifications of detection or non-detection of the card 5. To give a further example, the game machine 1 performs game processing in accordance with the number of times of detection or non-detection of the card 5 in a predetermined time period or the like. In such manners, the game machine 1 can realize acceptance of a large variety of input operations using the card 5.

Although the present embodiment has been explained using an example of a game to play a drum, it is to be noted that a similar structure may be applied to a variety of other games and applications other than games. Although the present embodiment has been explained using an example of a portable game machine 1, a similar structure may be applied to a stationary game machine, for example. In such a case, the short-distance wireless communication unit 21 may be provided in a controller of a game machine or the like. The short-distance wireless communication unit 21 may be connected with the game machine 1 in a wired or wireless manner as an optional device. Moreover, application of the technology herein is not limited to a game machine but a similar structure can be applied to a variety of information processing apparatus s such as a mobile telephone set, a smartphone, a tablet information terminal or a PC (Personal Computer).

Although in the above structure the IC tag 50 is mounted on the card 5, the IC tag 50 may be mounted on toys such as a miniature car, a doll or a figure, for example. The IC tag 50 may also be mounted on a variety of other objects. That is, a variety of electronic media other than a card type medium may be used for an input operation. Although in the above structure the user moves the card 5 having the IC tag 50 toward and away from the game machine 1, an operation to be performed by the user is not limited to this. For example, when the IC tag 50 is provided in an object which cannot be moved easily by the user, the user may move the game machine 1 toward and away from the IC tag 50.

Although the game machine 1 and the IC tag 50 are constructed to communicate with each other according to the communication standard of NFC, they may communicate according to another communication standard. For example, a communication standard for communication at a short range as described later may be employed for communication between the game machine 1 and the IC tag 50. That is, the short range means a communication distance with which the IC tag 50 enters the communication area of the short-distance wireless communication unit 21 when the user standing adjacent to the game machine 1 moves the card 5 toward the game machine 1 and the IC tag 50 exits the communication area when the user moves the card 5 away from the game machine 1. In this regard, the possibility of a structure for achieving communication at a longer range is not denied.

Although the present embodiment has a structure in which the game machine 1 accepts both of detection and non-detection of the card 5 as an input operation, the game machine 1 may be constructed to accept only one of detection and non-detection of the card 5 as an input operation. Although the game machine 1 is constructed to judge detection or non-detection of the card 5 using the communication area of the short-distance wireless communication unit 21 as a criterion, the criterion is not limited to this. The game machine 1 may be constructed to use a predetermined range scale as a criterion for judging detection or non-detection of the card 5, as long as the short-distance wireless communication unit 21 can calculate the distance to the card 5 in accordance with the strength of received radio waves, for example. A part or whole of processing performed by the short-distance wireless communication unit 21, the operation acceptance processor 31 and the game processor 32 of the game machine 1 may be performed by other devices such as a server machine, for example.

Embodiment 2

The game machine 1 in Embodiment 1 described above performs game processing in accordance with detection or non-detection of the card 5 in the communication area. In this regard, the game machine 1 in Embodiment 1 does not perform processing using data stored in the storage unit 53 of the IC tag 50 of the card 5. In Embodiment 2, a structure in which the game machine 1 performs game processing in accordance with detection or non-detection of the card 5 and data stored in the IC tag 50 will be explained.

With the game machine 1 according to Embodiment 1, the user can use any object for performing an input operation of the game machine 1 as long as the object has the IC tag 50 which can communicate with the short-distance wireless communication unit 21. In such a case, the user can perform an input operation of the game machine 1 using an object having the IC tag 50 even when the object is not the card 5. In contrast, a game system according to Embodiment 2 is constructed to preliminarily store a unique ID for a card in the storage unit 53 of the IC tag 50 and cause the game machine 1 to limit acceptance of an input operation based on detection or non-detection in accordance with an ID of the card 5.

The short-distance wireless communication unit 21 of the game machine 1 performs processing for sending control information or the like periodically and repeatedly. When receiving the control information or the like, the IC tag 50 reads out an ID from the storage unit 53 and sends the ID together with a response to the game machine 1. The short-distance wireless communication unit 21 of the game machine 1 detects the card 5 in the communication area in accordance with existence or non-existence of a response from the IC tag 50. The short-distance wireless communication unit 21 receives the ID of the card 5 together with the response. The short-distance wireless communication unit 21 notifies the processor 10 of the ID together with detection or non-detection of the card 5.

The operation acceptance processor 31 of the processor 10 judges whether the ID, notification of which has been given from the short-distance wireless communication unit 21, is an ID to be attached to the card 5 used for an input operation or not. Hereinafter, an ID to be attached to the card 5 used for an input operation will be referred to as a legitimate ID. When the ID notification of which has been given is a legitimate ID, the operation acceptance processor 31 accepts detection or non-detection of the card 5 as an input operation by the user as in the case of Embodiment 1. The game processor 32 performs game processing in accordance with an accepted input operation. When the ID notification of which has been given is not a legitimate ID, the operation acceptance processor 31 does not accept detection or non-detection of the card 5 as an input operation. Accordingly, the game processor 32 does not perform game processing. In such a case, the short-distance wireless communication unit 21 could have communicated with an object other than the card 5. It is to be noted that the game machine 1 may be constructed to preliminarily store information for judging whether an ID is a legitimate ID or not together with the game program 91 in the secondary storage unit 16, for example. To give another example, the game machine 1 may be constructed to obtain information for judgment from a server machine or the like via the communication unit 14.

Figure 5:
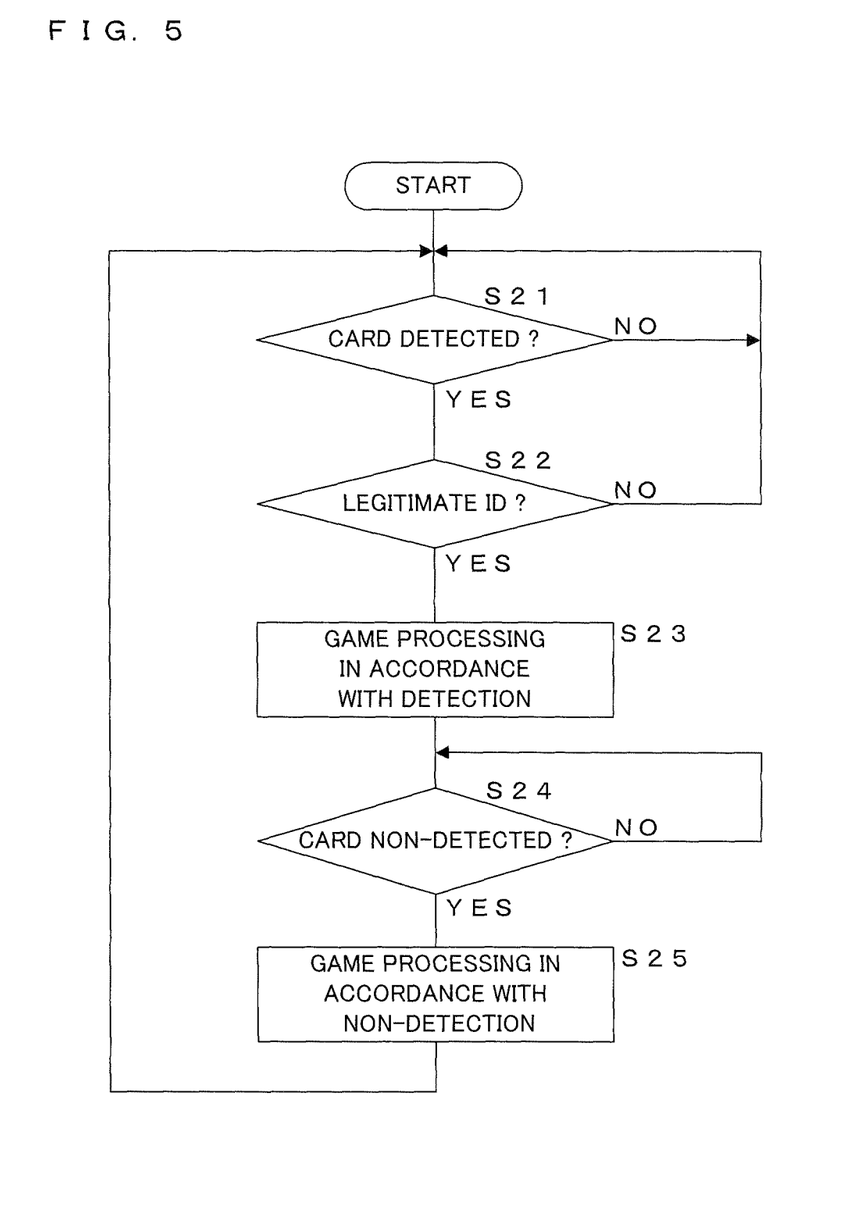
FIG. 5 shows an example non-limiting flowchart for illustrating the procedures of input operation acceptance processing to be performed by a processor of a game machine according to Embodiment 2.

FIG. 5 shows an example non-limiting flowchart for illustrating the procedures of input operation acceptance processing to be performed by the processor 10 of the game machine 1 according to Embodiment 2. It is to be noted that game processing in accordance with the duration obtained by a timer, performed in FIG. 4 is not performed in this flowchart. The game machine 1 according to Embodiment 2 may also perform game processing in accordance with the duration similarly. The operation acceptance processor 31 of the processor 10 of the game machine 1 according to Embodiment 2 judges whether notification indicating that the card 5 has been detected in the communication area is given from the short-distance wireless communication unit 21 or not (step S21). When notification of detection of the card 5 is given (S21: YES), the operation acceptance processor 31 of the processor 10 further judges whether an ID given from the short-distance wireless communication unit 21 together with detection of the card 5 is a legitimate ID or not (step S22). When notification of detection of the card 5 has not been given (S21: NO) or when the ID of the card 5 is not a legitimate ID (S22: NO), the processor 10 returns the process to the step S21 and waits until the card 5 of a legitimate ID is detected. When the ID of the card 5 is a legitimate ID (S22: YES), the game processor 32 of the processor 10 performs game processing in accordance with detection of the card 5 (step S23).

The operation acceptance processor 31 of the game machine 1 judges whether notification indicating that the card 5 is no more detected in the communication area has been given from the short-distance wireless communication unit 21 or not (step S24). When notification of non-detection of the card 5 has not been given (S24: NO), the operation acceptance processor 31 waits until notification of non-detection of the card 5 is given. When notification of non-detection of the card 5 is given (S24: YES), the game processor 32 of the processor 10 performs game processing in accordance with non-detection of the card 5 (step S25) and returns the process to the step S21. Although whether the ID of the card 5 is a legitimate ID or not is not judged in the case of non-detection of the card 5 in this flowchart, it is to be noted that the judgment may be made.

The game machine 1 according to Embodiment 2 having the structure described above does not perform game processing in accordance with detection or non-detection of the IC tag 50 of the card 5 by the short-distance wireless communication unit 21 when the ID received from the IC tag 50 of the card 5 is not a legitimate ID. In such a manner, the card 5 to be used for an operation of the game machine 1 can be limited to a legitimate card. It is possible to prevent the user from playing a game in a mode which is not intended by the developer of the game, i.e. playing a game using an object other than a card, for example.

Although whether an ID sent from the IC tag 50 to the game machine 1 is a legitimate ID or not is judged by the game machine 1 in Embodiment 2, it is to be noted that the content of judgment is not limited to this. For example, the game machine 1 and the IC tag 50 may be constructed to send and receive encrypted data, information on encryption key and the like to and from each other for authentication. In such a structure, the game machine 1 performs game processing in accordance with detection or non-detection of the card 5 when authentication succeeds. As described above, the game machine 1 and the IC tag 50 may send and receive any kind of data to and from each other and perform any kind of processing to data. For example, the user may register information such as an ID of the card 5 to be used for an operation in the game machine 1. The game machine 1 may be constructed to accept an operation using the card 5 of a registered ID. Although whether an ID is a legitimate ID or not is judged only in the case of detection of the card 5 in the flowchart illustrated in FIG. 5, judgment of an ID may be made even in the case of non-detection of the card 5.

Modification Example

A game system according to a modification example of Embodiment 2 is provided with a plurality of types of cards 5, on which instruments such as a castanet, a triangle, a glockenspiel and a cymbal are respectively drawn, for example, in addition to the card 5 on which a picture of a drum is drawn. Regarding IC tags 50 of the respective cards 5, different IDs are respectively stored in storage units 53. The short-distance wireless communication unit 21 of the game machine 1 detects the card 5 in the communication area in accordance with existence or non-existence of a response from each IC tag 50. The short-distance wireless communication unit 21 receives an ID of the card 5 together with a response. The short-distance wireless communication unit 21 notifies the processor 10 of the ID of the card 5 together with detection or non-detection of the card 5. The operation acceptance processor 31 of the processor 10 accepts an input operation for playing an instrument in accordance with detection or non-detection of the card 5. The game processor 32 judges the type of the card 5 in accordance with the ID of the card 5. For example, the game processor 32 outputs a sound of a drum when the type of the card 5 is a drum. The game processor 32 outputs a sound of castanet when the type of the card 5 is a castanet. As described above, the game processor 32 performs game processing in accordance with the type of the card 5. The game machine 1 may be constructed to preliminarily store the association between an ID of the card 5 and a type of the card 5 in the secondary storage unit 16, for example. The game machine 1 may also be constructed to obtain the association between an ID of the card 5 and a type of the card 5 from a server machine or the like via the communication unit 14, for example.

As described above, the game machine 1 according to a modification example of Embodiment 2 changes the content of game processing in accordance with an ID of the IC tag 50 of the card 5. In such a manner, the user can change the content of game processing by changing the type of the card 5 used for an operation even with the same movement of the card 5 toward or away from the game machine 1. Although the game system of the modification example herein has been explained using an example of a type of the card 5 in a game to play an instrument, it is to be noted that a similar structure can be applied to a variety of other games. For example, a similar structure can be applied to an action game to attack an enemy character with weapons. The user uses a plurality of cards 5 on which a variety of weapons are respectively drawn and moves the cards 5 toward or away from the game machine 1. The game machine 1 can be constructed to change the attack power, the target area, the effect of attack and the like in accordance with the type of a weapon of the card 5.

Since the other structures of the game machine 1 according to Embodiment 2 are similar to those of the game machine 1 according to Embodiment 1, it is to be noted that an identical symbol is attached to similar parts and detailed explanation thereof will be omitted.

Embodiment 3

A game system according to Embodiment 3 is constructed to send data from the game machine 1 to the IC tag 50 of the card 5 and store the data in the storage unit 53 of the IC tag 50. The game machine 1 according to Embodiment 3 gives a request for sending data to the card 5 when the short-distance wireless communication unit 21 detects the card 5. The card 5 reads out data from the storage unit 53 in accordance with the request for sending data from the game machine 1 and sends the read data to the game machine 1. Upon receiving the data from the card 5, the game machine 1 performs game processing in accordance with the received data. The game machine 1 sends data generated as a result of game processing together with an instruction for writing (storing) the data to the card 5. Upon receiving the instruction for writing data from the game machine 1, the card 5 writes (stores) the data received together with the write instruction in the storage unit 53. For this reason, the storage unit 53 provided in the IC tag 50 of the card 5 is constituted of a nonvolatile memory device having a data-rewritable structure such as an EEPROM or a flash memory, for example.

In a game to play a drum as described above, for example, the storage unit 53 of the card 5 stores data such as an experience point or an overall score achieved in playing the game using the card 5. When the user operates to beat a drum by moving the card 5 toward the game machine 1, the game machine 1 obtains data of an experience point from the card 5. The game machine 1 adds an experience point obtained from game processing by this operation and sends a new experience point together with a write instruction to the card 5. The card 5 stores the experience point received from the game machine 1 in the storage unit 53 and updates an experience point involved in this card 5.

Figure 6:
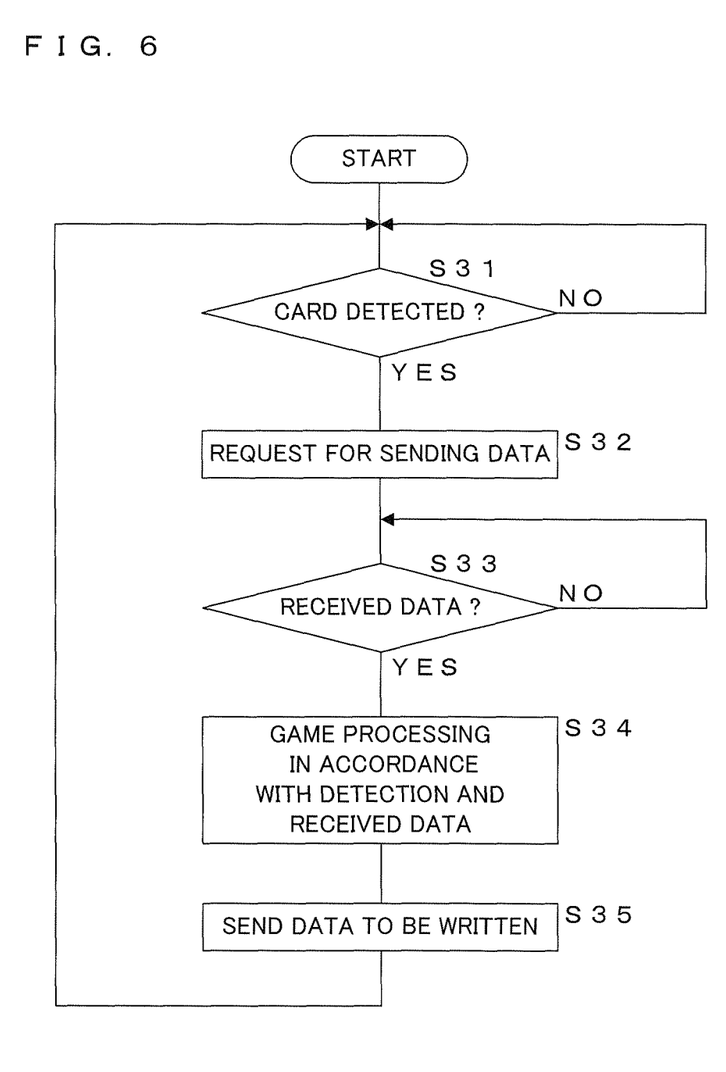
FIG. 6 shows an example non-limiting flowchart for illustrating the procedures of input operation acceptance processing to be performed by a processor of a game machine according to Embodiment 3.

FIG. 6 shows an example non-limiting flowchart for illustrating the procedures of input operation acceptance processing to be performed by the processor 10 of the game machine 1 according to Embodiment 3. It is to be noted that illustrated in this flowchart is an example in which the game machine 1 accepts an input operation in accordance with detection of the card 5, and acceptance of an input operation in accordance with non-detection of the card 5 is omitted in the figure. The operation acceptance processor 31 of the processor 10 of the game machine 1 judges whether notification indicating that the card 5 has been detected in the communication area has been given from the short-distance wireless communication unit 21 or not (step S31). When notification of detection of the card 5 has not been given (S31: NO), the operation acceptance processor 31 waits until notification of detection of the card 5 is given.

When notification of detection of the card 5 is given (S31: YES), the processor 10 of the game machine 1 causes the short-distance wireless communication unit 21 to give a request for sending data to the card 5 (step S32). The processor 10 judges whether the short-distance wireless communication unit 21 has received data from the card 5 or not (step S33). When the short-distance wireless communication unit 21 has received data from the card 5 (S33: NO), the processor 10 waits until the short-distance wireless communication unit 21 receives data. When the short-distance wireless communication unit 21 receives data from the card 5 (S33: YES), the game processor 32 of the processor 10 performs game processing in accordance with detection of the card 5 and the data received from the card 5 (step S34). The processor 10 causes the short-distance wireless communication unit 21 to send data to be written, which has been generated by game processing, to the card 5 (step S35) and returns the process to the step S31.

Figure 7:
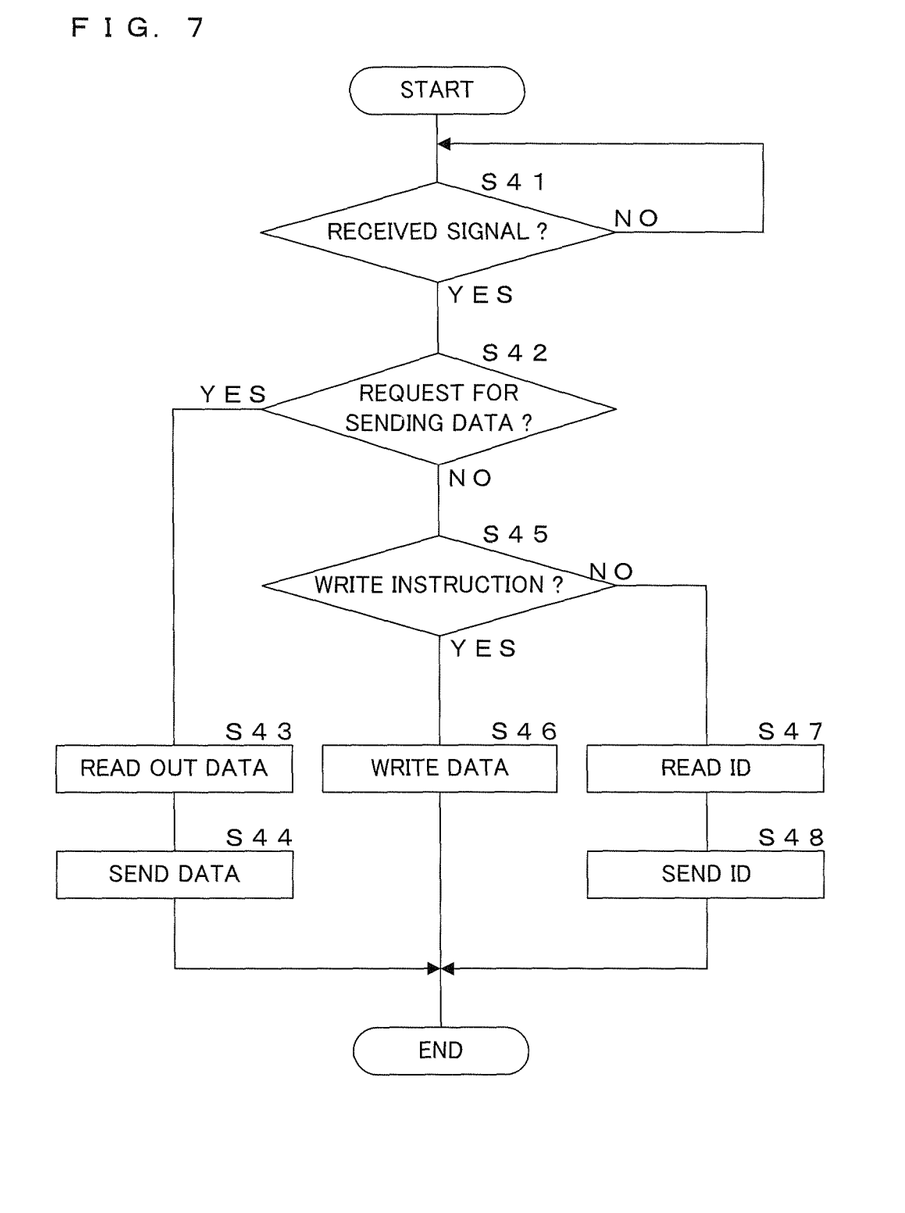
FIG. 7 shows an example non-limiting flowchart for illustrating the procedures of communication processing to be performed by an IC tag of a card according to Embodiment 3.

FIG. 7 shows an example non-limiting flowchart for illustrating the procedures of communication processing to be performed by the IC tag 50 of the card 5 according to Embodiment 3. The processor 51 of the IC tag 50 judges whether the short-distance wireless communication unit 52 has received a signal from the game machine 1 or not (step S41). When the short-distance wireless communication unit 52 has not received a signal (S41: NO), the processor 51 waits until the short-distance wireless communication unit 52 receives a signal. When the short-distance wireless communication unit 52 receives a signal from the game machine 1 (S41: YES), the processor 51 further judges whether the received signal is a request for sending data or not (step S42). When the received signal is a request for sending data (S42: YES), the processor 51 reads out requested data from the storage unit 53 (step S43). The processor 51 sends the read data to the game machine 1 (step S44) and terminates the process.

When the received signal from the game machine 1 is not a request for sending data (S42: NO), the processor 51 further judges whether the received signal is a write instruction of data or not (step S45). When the received signal is a write instruction of data (S45: YES), the processor 51 writes the data received together with the write instruction in the storage unit 53 (step S46) and terminates the process. When the received signal from the game machine 1 is not a write instruction of data (S45: NO), the processor 51 reads out an ID from the storage unit 53 (step S47). The processor 51 sends the read ID to the game machine 1 (step S48) and terminates the process.

A game system according to Embodiment 3 having the structure described above sends data from the game machine 1 to the card 5 and stores the data in the storage unit 53 of the card 5 when the user operates to move the card 5 toward or away from the game machine 1. In such a manner, it is possible to preliminarily store information involved in a game in the card 5 and update the stored information in accordance with the operation by the user using the card 5. By preliminarily storing information in the card 5, it is possible to play a game reflecting information stored in the card 5 even when the user plays the same game with another game machine 1, for example.

Although Embodiment 3 is constructed to write data in the card 5 every time the game machine 1 detects the card 5 in the flowchart illustrated in FIG. 6, it is to be noted that the frequency of writing of data is not limited to this. For example, the game machine 1 may be constructed to write data once for several times of detection. To give another example, the game machine 1 may be constructed to write data when needed such as when data is updated in game processing. Data may be stored not in the card 5 but in the secondary storage unit 16 by the game machine 1 in association with an ID of the card 5.

Modification Example

Figure 8:
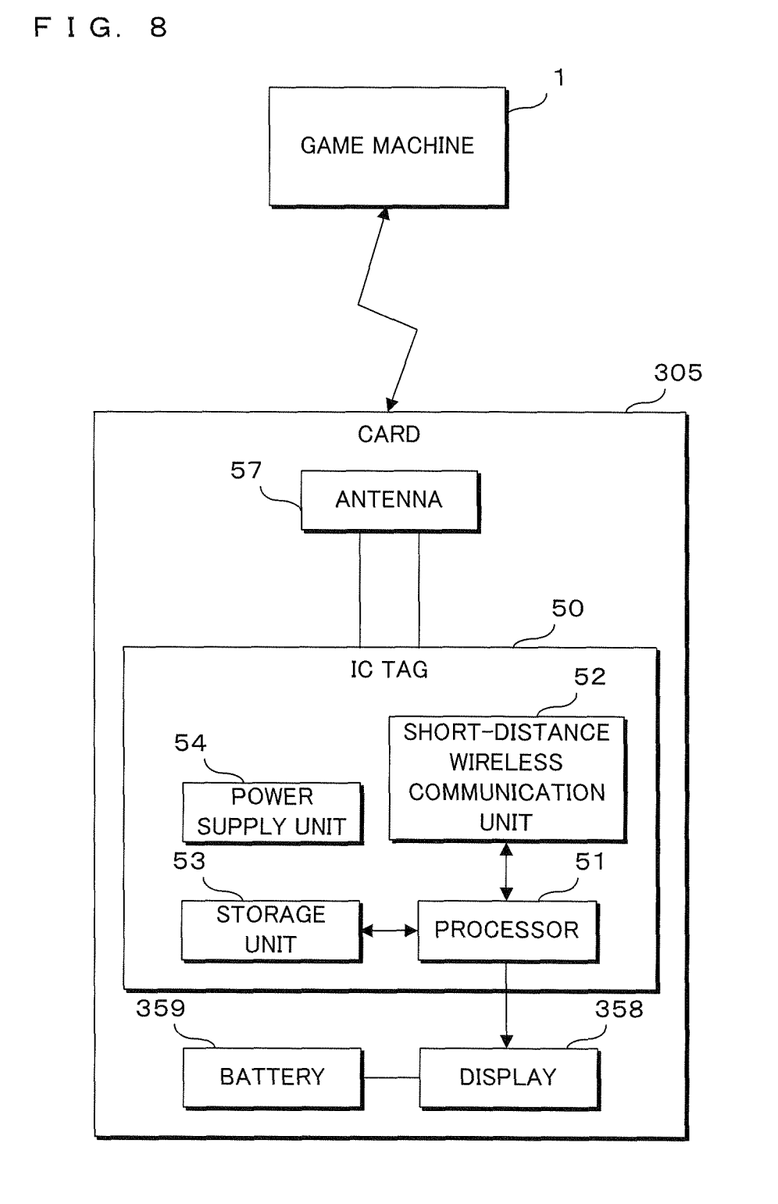
FIG. 8 shows an example non-limiting block diagram for illustrating the structure of a game system according to a modification example of Embodiment 3.

FIG. 8 shows an example non-limiting block diagram for illustrating the structure of a game system according to a modification example of Embodiment 3. A card 305 of a game system according to a modification example of Embodiment 3 is provided with a display 358 and a battery 359 in addition to the IC tag 50 and the antenna 57 described above. The display 358 is constituted of a display device such as a liquid crystal panel or electronic paper, for example. The display 358 can display a variety of information in accordance with a command from the processor 51 of the IC tag 50. The battery 359 is to supply electric power to the display 358 and may be a rechargeable battery, a solar cell or the like. The card 305 may be constructed to supply electric power from the battery 359 to the IC tag 50. In such a structure, the IC tag 50 does not need to have the power supply unit 54.

The card 305 according to Embodiment 3 can display data stored in the storage unit 53 on the display 358. For example, the card 5 stores data of an experience point related to the card 5 in the storage unit 53. In such a case, the processor 51 of the card 5 reads out data of an experience point from the storage unit 53 and gives the read data to the display 358. In such a manner, an experience point is displayed on the display 358. When a game is played using the card 305 and an experience point is updated by game processing, the processor 51 stores a new experience point received from the game machine 1 in the storage unit 53. The processor 51 gives the experience point to the display 358 and updates the content of display.

As described above, the card 305 according to a modification example of Embodiment 3 is provided with the display 358 and is constructed to display data stored in the storage unit 53. In such a manner, the user can easily check data stored in the card 5 even when the user does not have the game machine 1, for example. The card 305 does not always need to display data on the display 358. For example, a touch sensor, a switch or the like may be provided at the card 305. In such a structure, data can be displayed on the display 358 for a predetermined time period between a few seconds and a few dozen seconds when the user touches the card 305 or when the user operates the switch, for example. The card 305 may be constructed not to display data stored in the storage unit 53 on the display 358 but to output data using another device. For example, one or a plurality of LEDs may be provided at the card 305 so as to be turned on, off or blink in accordance with data stored in the storage unit 53. To give another example, a speaker may be provided at the card 305 so as to output sounds in accordance with data stored in the storage unit 53.

Since the other structures of the game machine 1 according to Embodiment 3 are similar to those of the game machine 1 according to Embodiment 1, it is to be noted that an identical symbol is attached to similar parts and detailed explanation thereof will be omitted.

When used in the present specification, each element or the like denoted in a singular form with a word "a" or "an" attached in front thereof is to be understood not to eliminate the possibility of a plurality of elements related thereto.

An information processing system according to the present embodiment is constructed to accept detection or non-detection of a communication device as an input operation and perform information processing. In such a manner, a large variety of input operations can be realized and therefore the operability, the convenience and the like of the information processing apparatus can be enhanced.

What is claimed is:

1. An information processing system comprising:
   a communication device having a first wireless communication unit for sending and receiving data to and from an information processing apparatus through near field wireless communication; and
   an information processing apparatus having
      a second wireless communication unit for sending and receiving data to and from the communication device through near field wireless communication,
      a detector for detecting existence of the communication device in an effective communication area of the second wireless communication unit,
      an acceptance unit for accepting a detection following a non-detection or a non-detection following a detection by the detector as an input operation, and
      an information processor for performing control of an application operation in accordance with a time difference between (A) a first time point of occurrence of a detection following a non-detection by the detector or a non-detection following a detection by the detector, and (B) a subsequent second time point of occurrence of a detection following a non-detection by the detector or a non-detection following a detection by the detector.

2. The information processing system according to claim 1, wherein the acceptance unit of the information processing apparatus accepts a detection following a non-detection or a non-detection following a detection by the detector as an input operation by a user in accordance with movement of the user holding the communication device.

3. The information processing system according to claim 1, wherein the information processor of the information processing apparatus performs said control of the application operation in accordance with a time interval between successive occurrences of said detection following non-detection or successive occurrences of said non-detection following detection by the detector.

4. The information processing system according to claim 1, wherein the information processor of the information processing apparatus performs said control of the application operation in accordance with a number of occurrences of said detection following non-detection or a number of occurrences of said non-detection following detection by the detector.

5. The information processing system according to claim 1, wherein the information processor of the information processing apparatus performs said control of the application operation in accordance with a difference in time between a time point of occurrence of said detection following a non-detection or said non-detection following a detection by the detector and an occurring of an event in the information processing.

6. The information processing system according to claim 1, wherein the information processor of the information processing apparatus performs said control of the application operation such that a duration of one or more events in the control of the application operation corresponds to a duration of continuous detection or to a duration of continuous non-detection by the detector.

7. The information processing system according to claim 1, wherein
the second wireless communication unit of the information processing apparatus sends and receives data to and from the communication device when the detector detects existence of the communication device, and
wherein the information processor performs said control of the application operation in accordance with the input operation accepted by the acceptance unit and a result of at least of sending and receiving of data by the second wireless communication unit.

8. The information processing system according to claim 7, wherein the information processor of the information processing apparatus changes a content of said control of the application operation, which is to be performed in accordance with the input operation accepted by the acceptance unit, based on the data received by the second wireless communication unit.

9. The information processing system according to claim 7, wherein the information processor of the information processing apparatus does not perform said control of the application operation in accordance with the input operation accepted by the acceptance unit when the second wireless communication unit does not receive predetermined data.

10. The information processing system according to claim 1, wherein
the communication device has a storage unit for storing data, and
the information processor of the information processing apparatus performs processing for causing the second wireless communication unit to send an instruction for updating data stored in the storage unit to the communication device on the basis of a result of the control of the application operation.

11. The information processing system according to claim 10, wherein the communication device has a display for displaying information in accordance with the data stored in the storage unit.

12. The information processing system according to claim 1, wherein the first wireless communication unit and the second wireless communication unit send and receive data to and from each other through contactless communication.

13. The information processing system according to claim 1, wherein the said control of the application operation is performed in accordance with a time difference between a time point of occurrence of a detection following a non-detection and a time point of occurrence of a non-detection following the detection.

14. A game system comprising:
a communication device having a first wireless communication unit for sending and receiving data to and from a game machine through near field wireless communication; and
a game machine having a second wireless communication unit for sending and receiving data to and from the communication device through near field wireless communication, a detector for detecting existence of the communication device in an effective communication area of the second wireless communication unit, an acceptance unit for accepting a detection following a non-detection or a non-detection following a detection by the detector as an input operation, and an information processor for performing control of a game operation in accordance with a time difference between (A) a first time point of occurrence of a detection following a non-detection by the detector or a non-detection following a detection by the detector, and (B) a subsequent second time point of occurrence of a detection following a non-detection by the detector or a non-detection following a detection by the detector.

15. An information processing apparatus comprising:
a wireless communication unit for sending and receiving data to and from a communication device having a wireless communication function through near field wireless communication,
a detector for detecting existence of the communication device in an effective communication area of the wireless communication unit,
an acceptance unit for accepting a detection following a non-detection or a non-detection following a detection by the detector as an input operation, and
an information processor for performing control of an application operation in accordance with a time difference between (A) a first time point of occurrence of a detection following a non-detection by the detector or a non-detection following a detection by the detector, and (B) a subsequent second time point of occurrence of a detection following a non-detection by the detector or a non-detection following a detection by the detector.

16. A non-transitory computer readable storage medium having stored therein a program for causing an information processing apparatus, which is provided with a wireless communication unit for sending and receiving data to and from a communication device having a wireless communication function through near field wireless communication and a detector for detecting existence of the communication device in an effective communication area of the wireless communication unit, to operate as:
an acceptance unit for accepting a detection following a non-detection or a non-detection following a detection by the detector as an input operation, and
an information processor for performing control of an application operation in accordance with a time difference between (A) a first time point of occurrence of a detection following a non-detection by the detector or a non-detection following a detection by the detector, and (B) a subsequent second time point of occurrence of a detection following a non-detection by the detector or a non-detection following a detection by the detector.

17. An information processing method comprising:
detecting existence of a communication device having a wireless communication function in an effective communication area of near field wireless communication,
accepting a detection following a non-detection or a non-detection following a detection of existence of the communication device as an input operation, and
performing control of an application operation in accordance with a time difference between (A) a first time point of occurrence of a detection following a non-detection or a non-detection following a detection, and (B) a subsequent second time point of occurrence of a detection following a non-detection or a non-detection following a detection.

18. An information processing apparatus comprising:
a wireless communication interface for sending and receiving data to and from a communication device through near field wireless communication,
one or more processors configured to perform operations comprising:

detecting existence of the communication device in an effective communication area of the wireless communication interface, accepting, based upon said detecting, a detection following a non-detection or a non-detection following a detection of the communication device in said effective communication area as an input operation, and controlling an application operation to perform an operation determined in accordance with a time difference between (A) a first time point of occurrence of a detection following a non-detection or a non-detection following a detection, and (B) a subsequent second time point of occurrence of a detection following a non-detection or a non-detection following a detection.

19. The information processing apparatus according to claim 18, wherein each said detection following a non-detection and each said non-detection following a detection corresponds to an input operation by a user in accordance with movement of the user holding the communication device.

* * * * *